United States Patent Office 3,262,763
Patented July 26, 1966

---

3,262,763
HIGH TEMPERATURE-RESISTANT MATERIALS OF ALUMINUM, BORON, NITROGEN, AND SILICON AND PREPARATION THEREOF
Max F. Bechtold, Kennett Square, Pa., assignor to E. I. du Pont de Nemours and Company, Wilmington, Del., a corporation of Delaware
No Drawing. Filed Feb. 19, 1964, Ser. No. 345,857
9 Claims. (Cl. 29—182.5)

This application is a continuation-in-part of my co-pending, coassigned application Serial No. 78,830, filed December 28, 1960, and now abandoned.

This invention relates to high temperature-resistant materials of aluminum, boron, nitrogen and silicon, to such materials modified with oxygen, to articles of manufacture prepared from or composed of these materials, and to a method for preparing such articles.

Recently there has been great interest in high temperature materials capable of withstanding high loads at elevated temperatures and also capable of resisting corrosion by hot gases. Demand for such high temperature materials has been especially heavy since commercial development of jet engines and rockets, which have been progressively improved in design to operate at higher and higher temperatures. Many high temperature metals, including super-alloys and the refractory metals, such as molybdenum, have been used as turbine blades, fans, nozzles for jet engines, gas turbines, rockets, and the like, but such materials have not been too satisfactory in view of the increased high temperature requirements imposed. These materials tend to soften at high operating temperatures or require protective coatings against oxidation, and are in general difficult to machine into precise shapes. Other materials proposed for these uses, such as graphite, silicon carbide and metal oxides, suffer from similar deficiencies as well as brittleness.

The present invention provides materials having high strength and durability at elevated temperatures in air which are derived from readily available, inexpensive, light elements. These materials are strong, low in density, oxidation-resistant at high temperatures (oxidation may occur but the resultant oxide forms a protective coating), machinable to a considerable degree and possess other desirable properties. These properties result from two essential property-defining structures, viz., a solid, continuous, matrix structure containing nitride, and a metallic structure, both of which are discussed in detail below. The essential elemental constituents of these materials are aluminum, boron, nitrogen, and silicon in the proportions, by weight, of 15–70% Al, 1–45% B, 5–35% N and 10–55% Si. The materials and objects of this invention may also contain up to 30% oxygen, all percentages being in terms of percent by weight of total Al, B, N, and Si.

The preferred compositions and processes of this invention yield accurately shaped objects by a brief process carried out at temperatures as low as 700° C. that are ready for immediate use in air at high temperature.

The shaped objects or articles of manufacture of this invention are prepared by machining or otherwise shaping materials of this invention or by initially forming the materials in the desired shape. The materials and shaped objects, sometimes hereinafter referred to as converted compositions, objects or articles, are prepared from substantially homogeneous powder compositions, as hereinafter described.

The solid continuous matrix structure of the materials and articles is refractory at high temperature and is semi-metallic or non-metallic in nature. It contains aluminum nitride as an essential strength-producing constituent and may also contain silicon nitride, aluminum oxide and silicon dioxide.

The other essential property-defining structure which is metallic, constitutes up to 84.4% by weight of the converted objects. This structure contains metallic silicon in non-oxidized and non-nitrided condition, which may be in the form of the element or its alloys with aluminum and/or boron. This structure contributes increased machinability, good electrical and thermal conductivity, good impact resistance and improved oxidation resistance at temperatures of 1400–2000° C. particularly when aluminum is present.

The metallic structure is fluid at high temperature and is able to flow, diffuse or migrate to the surface of the shaped object to provide upon contact with the atmosphere an oxidation-resistant surface layer which is self-healing, i.e., reforms immediately if ruptured at high temperature in air. The metallic structure may, of course, contain other phases dispersed therein, which may be metallic or non-metallic, separate from the rigid matrix structure. The metallic structure tends to be continuous and highly conducting of electricity, especially when it comprises above about 20% by weight of the final converted composition.

To insure adequate self-healing properties, it is essential that silicon in the metallic structure constitute at least 5%, preferably at least 10% (by weight), of the materials and objects of this invention. The presence of the metallic structure and the phases dispersed therein is easily demonstrated by metallography including hardness measurements, and by X-ray diffraction techniques.

The proportion of metallic structure in the converted compositions is readily calculated from composition data utilizing the well-established chemical fact that aluminum nitride is the most stable at high temperatures of the nitrides of elements present in the converted alloys of this invention. Thus, nitrogen present in the compositions is calculated first as aluminum nitride, AlN; any remaining nitrogen is then calculated as silicon nitride, $Si_3N_4$. After apportionment of the nitrogen in the composition, oxygen, if present, is similarly distributed first to aluminum in the form of $Al_2O_3$, then to silicon in the form of $SiO_2$. The amounts of aluminum and silicon thus accounted for in terms of nitrides and oxides are substracted from the total amounts present in the composition, leaving as difference the amounts present in the metallic structure.

It will be apparent from the foregoing that the materials and articles of manufacture of this invention do not encompass simple mixtures or complex compounds composed entirely of nitrides and oxides. In other words, the compositions cannot be prepared from combinations of AlN, $Si_3N_4$, $SiO_2$, $B_2O_3$, and $Al_2O_3$.

Oxygen is supplementary to nitrogen in the sense that oxygen in combination with aluminum provides a refractory phase for the rigid matrix of the converted objects of this invention. Oxygen is preferably introduced by high-temperature heat treatment in air of a composition containing aluminum, boron, nitrogen, and silicon. It is desirable that the oxygen content not exceed 30% based on a total of aluminum, nitrogen, silicon and boron.

The boron-containing materials of this invention have properties that are outstanding for application as electric heating elements. They are superior to Al-N-Si compositions for shielding for nuclear reactors, and for the generation of electricity by application of heat by virtue of their thermoelectric power. When these materials are derived from combinations of aluminum, boron and silicon nitride, they are less dependent on heat-treatment in air for the development of full strength than are Al-N-Si compositions, especially when less than about 50% Al is used. An important advantage of such materials is their outstanding weight and dimensional stability in the range of about 1150–1350° C. after preliminary heat-treatment at 500–1100° C. This effect is most pronounced in hot-pressed specimens. Moreover, after one exposure to the complete range (500°–1500° C.) of temperatures used in the standard oxidation test (see below), the present materials are remarkably stable, both in weight and dimensions during further exposure to temperatures in this range.

Converted materials outside the above-defined ranges are deficient in such properties as transverse rupture strength, resistance to high temperature oxidation and freedom from mechanical defects. The use of less than 15% aluminum is undesirable because of the extreme brittleness of the products. On the other hand, when more than 70% aluminum is present, the high temperature strength is undesirably low and the compositions exhibit cracking and poor shape stability during firing in air. Materials with excellent strength and oxidation resistance are obtained when the aluminum content is in the range of 19–60% preferably 25–56%.

The use of less than 5% nitrogen also leads to poor shape stability and to low high-temperature strength. When more than 35% nitrogen is employed, the compositions are undesirably brittle and sensitive to moisture. Converted compositions containing 10–30% N have very desirable properties, and the best combination of properties is obtained when the nitrogen content is in the range of 10–25%.

In these boron-containing materials satisfactory oxidation resistance can be maintained with proportions of silicon as low as 10%. For applications requiring maintenance of high electrical conductivity during prolonged exposure at high temperatures, converted compositions having a silicon content of at least 15% are preferred. At silicon contents below 25% it is desirable that sufficient boron be present to make a total content of boron and silicon of at least 25%. The use of more than 55% silicon leads to excessive brittleness and to silicon exudation when the final converted composition is employed at temperatures in the range of 1400° C. and above. The use of at least 2% boron and preferably at least 5% boron is desirable to obtain enduring weight stability when heating in air at temperatures in the range of about 1100–1400° C., after preliminary treatment at 500–1100° C. The presence of more than about 45% boron results in brittle products having reduced electrical conductivity. It is better to use 2–28% boron, preferably 5–28% boron.

It is apparent from the foregoing that compositions containing 2–28% boron form a preferred class of this invention. Still more preferred are those compositions containing 19–60% Al, 2–28% B, 10–30% N, and 10–35% Si, wherein the metallic structure is 5–68.7% of the total composition. Most preferred are those containing 25–56% Al, 5–28% B, 10–25% N, and 10–35% Si, wherein the metallic structure is 5–65.7% of the total composition.

The converted compositions and objects of this invention are prepared from powder compositions containing aluminum, boron, nitrogen, and silicon, in the proportions by weight, 15–70 % Al, 1–45% B, 5–35% N and 10–55% Si. Such compositions may also contain up to 30% oxygen (based on the total of aluminum, boron, nitrogen, and silicon) in the form of oxides of Al, B or Si or the reaction products of such oxides. However, it is preferred that oxygen be introduced by heating the converted material in an oxidizing atmosphere such as air or oxygen. Powder compositions containing smaller proportions of nitrogen than that indicated above or even entirely devoid of nitrogen can also be employed and the desired nitrogen introduced by nitriding. Whatever the method of preparation, the aluminum and silicon present must exceed the amount required to react with the nitrogen and oxygen desired in the final product by an amount sufficient to provide at least 5%, preferably at least 10% by weight of metallic structure as hereinbefore defined. The preferred proportions of the essential elements in the powder are the same as those mentioned above in connection with the converted materials of this invention with the proviso that the proportion of nitrogen may be reduced or nitrogen may be entirely absent and the desired proportion introduced by nitriding.

In preparing the materials of this invention, aluminum is preferably introduced as the free metal in either powder or flake form. Susceptability to nitridation and volume change can be controlled in part by the proportions of flake and powder used. Alloys of aluminum with silicon and/or boron can also be employed. Boron is preferably used in the form of elemental boron or aluminum-boron alloys. Nitrogen is preferably introduced by nitriding and for this purpose elemental nitrogen or in some cases ammonia, especially at nitridation temperatures above 850° C., may be used. If nitrogen is to be included in the powder composition, it is preferably in the form of silicon nitride. Silicon is preferably employed as elemental silicon, silicon nitride and/or aluminum-silicon alloys.

In preparing nitrided materials, it is preferred that nitriding be carried out at 700–1425° C., preferably 750–950° C., for about one hour. Nitridation tends to attack the metal-metal contacts made by pressing, i.e., disrupts some of the metallic-containing continuum, while increasing pressure in compaction tends to preserve such contacts. Thus, by control of pressure, composition and degree of nitridation, final objects of any given electrical resistivity in the range from about $10^{-4}$ to greater than $10^{+6}$ ohm-cm. can be prepared. Electrical resistance tends to decrease with increasing concentrations of aluminum in the final object. Increasing aluminum concentration also tends to decrease high temperature strength, but to increase oxidation resistance, machinability, and impact strength.

It is preferred that at least 75% (by weight) of the powder composition has a particle size of less than 75 microns since uniform converted compositions are readily obtained from such powders. However, materials of larger particle size, i.e., of 150 microns or more, give useful products. To insure uniformity of the powder metallurgy composition, the particulate raw materials used to make up the composition are intimately mixed either during grinding or, if properly sized, powdered components are initially employed, after or during their placement in a common container.

The powder compositions are readily shaped, for example, by cold-pressing at a pressure of 5000–60,000 lb./sq. in. or more, by slip-casting, or by extrusion at a temperature below 700° C. and then converted by firing (e.g., by placing the shaped object directly in a heated space) at a temperature of at least 700° C., but preferably not above 1700° C. Most preferably the temperature is in the range of 750–1500° C. Firing can be carried out in air, in an inert atmosphere, in vacuum, in which case a temperature of 900°–1200° C. is preferred, or in nitrogen if a nitrogen deficient composition is being utilized. Sintering in nitrogen at about 850° C. produces exceptionally strong objects. This may be carried out by placing the object in a nitrogen atmosphere at room temperature, then heating to sintering temperature.

Since a calorescent reaction occurs when the powder metallurgy compositions are heated to firing temperature, the actual temperature attained by the composition during conversion is usually much higher than the nominal firing temperature. Sintering at low temperatures, i.e., 700-900° C. can be done slowly enough to avoid calorescent reactions. Converted objects are also obtained by hot-pressing the powder composition at a pressure of at least 1000 lb./sq. in. and a temperature of at least 700° C., but preferably not above 1700° C. Most preferably the temperature is in the range of 1100–1500° C. and the pressure is between 2000 and 5000 lb./sq. in.

The time of heating the powder compositions at the above temperatures must be at least sufficient to insure sintering of the particles of the powder composition, if the novel converted objects having the unexpected characteristics herein disclosed are to be formed. Times of 30 seconds to 30 minutes usually suffice, although longer periods may be employed if desired without detrimental effect. In fact, longer times (e.g., 16 hours or more) are sometimes advantageous to develop the maximum strength and to increase the electrical resistance. It is preferred that heating, if carried out in air, be rapid to avoid undue oxidation of the powder composition before conversion.

The powder compositions may be converted by compressing and firing in the dry state. However, it is convenient to use slip-casting or pottery-molding techniques whereby the powder is moistened with a liquid, e.g., water, to assist in forming it into the desired shape. Acidic aqueous solutions prepared by adding sufficient acetic acid to a dilute aqueous solution of NaOH (containing up to 2% NaOH) to provide a pH less than 7 are particularly desirable for this purpose and produce shaped objects which, after drying and firing, form converted objects having desirable properties. It is essential that any water or other volatile liquid present in the shaped powder object be reduced to less than about 3% (by weight) before heat-treatment to prevent rupture of the object during firing or sintering.

The powder compositions of this invention, especially those rich in aluminum, can also be formed by compacting and extruding, before firing or sintering.

When nitrogen is introduced during conversion of the powder composition to alloy by carrying out the conversion in an atmosphere of nitrogen or ammonia, the composition is heated in the nitrogenous atmosphere at a temperature of at least 700° C., preferably not above 1700° C., until the desired nitrogen content has been obtained. Most preferably the temperature is in the range of 750–1500° C. A period of 0.5–10 hours at a temperature above 700° C. is usually sufficient for nitridation. Although nitridation is usually carried out at approximately atmospheric pressure, i.e., at a pressure in the range of 0.5–2 atmospheres, somewhat higher pressures (not to exceed about 10 atmospheres) are sometimes advantageous in promoting more rapid reaction with nitrogen.

In nitriding, care must be exercised to insure that sufficient nitrogen is introduced so that the nitrided product contains at least 5% nitrogen, but that nitridation is not so complete as to reduce, below the limits hereinbefore stated, the free metallic structure necessary for maintenance of self-healing properties on high temperature exposure in air. In preparing compacts for nitridation, a compaction pressure should be employed that is sufficiently low to produce a compact readily penetrated by nitrogen during the nitriding step.

A preferred method of fabricating articles of manufacture of this invention comprises forming the powder composition into a desired shape, e.g., by cold-pressing, partially sintering the thus shaped composition, i.e., heating the composition to a temperature below that at which calorescence occurs, machining or extruding the partially sintered body to the precise shape desired, and then finish-firing to complete conversion of the composition. The prefiring or partial firing step serves to bind the particles of the powder composition together giving a strong but easily machinable object. The finish-firing step converts the machined, partially fired composition to a converted object of this invention, and relieves such composition from the internal stresses normally introduced by machining. Since the objects of this invention are more difficult to machine after complete firing, i.e., after calorescence, this method provides a practical route to articles of manufacture, even where dimensional tolerances are low.

The invention is illustrated in greater detail by the following examples. In these examples, the starting materials employed were of ordinary commercial purity. Transverse rupture strength was measured with an "Instron" low-speed tensile tester Type TT–C–L using a specimen nominally ¼" x ¼" in cross-section supported symmetrically by parallel ceramic rods ⅛" in diameter and 1" apart mounted on a supporting test fixture. Force was applied at the center of the portion of the bar between the supports by the edge (2" long, radius ¹⁄₁₆") of a V-shaped fixture.

As a standard test of oxidation resistance, the changes in weight and linear dimensions of test specimens were determined after exposure in air to temperatures of 500°, 750°, 1000°, 1100°, 1200°, 1300°, 1400°, and 1500° C. for 16 hours at each temperature. After each heating period, the specimen was cooled to room temperature, weighed and measured. Results are expressed as the cumulative percentage change occuring during the heat-treatments based on the original values.

*Example I*

A mixture of aluminum, silicon nitride and amorphous boron, all in powder form, was dry-milled for 24 hours at 85 r.p.m. in a porcelain ball-mill (250 cc. capacity) containing a dozen ¾" x ¾" porcelain cylinders. The resultant fine powder was screened through a 200-mesh screen (opening 74 microns) to remove 0.5% (by weight) of coarse particles. The powder contained aluminum, boron, nitrogen, and silicon in the proportions 24.39 Al, 43.99 B, 13.10 N, 18.52 Si. The powder was fabricated into a metallic bar by hot-pressing in a graphite die at 3000 p.s.i. and 1200° C. A similar bar was fabricated by cold-pressing at 30,000 p.s.i. and then firing in air at 1150° C. (with calorescence) for 2 minutes. The properties of these bars are shown in Table I:

TABLE I.—PROPERTIES OF HOT PRESSED BARS

| Property | Hot-Pressed Bar | Air-Fired Bar |
| --- | --- | --- |
| Density (g./cc.) | 1.82 | 1.71 |
| Transverse rupture strength in air at 1,200° C. (p.s.i.) | 14,070 | 6,645 |
| Oxidation resistance | (¹) | (¹) |

¹ Satisfactory at 1,500° C.

*Examples II–VI*

These examples illustrate the preparation of aluminum, boron, nitrogen, silicon powder compositions and alloys. The powders were ball-milled and screened as described in Example I. The screening removed only 1.2–1.6% of material which was coarser than 75 microns. The proportions of aluminum, boron, nitrogen, and silicon employed in the powder compositions are shown in Table II. The powder compositions were converted both by hot-pressing and by air-firing. The conditions of conversion and the properties of the resultant objects are shown in Table III.

TABLE II.—Al-B-N-Si COMPOSITIONS

| Example No. | Input Composition [1] | | | |
|---|---|---|---|---|
| | Al | B | N | Si |
| II | 31.27 | 28.20 | 16.79 | 23.74 |
| III | 36.40 | 16.41 | 19.55 | 27.64 |
| IV | 39.65 | 8.96 | 21.29 | 30.10 |
| V | 41.51 | 4.69 | 22.29 | 31.51 |
| VI | 42.50 | 2.40 | 22.83 | 32.27 |

[1] Al, B, and $Si_3N_4$ were employed as raw materials.

TABLE III.—PROPERTIES OF Al-B-N-Si OBJECTS

| Example No.[1] | Density (g./cc.) | Transverse Rupture Strength at 1,200° C. (p.s.i.) | Dimensional Change (percent) on Heating to 1,400° C.[2] |
|---|---|---|---|
| II | | | |
| a | 1.94 | | 1.42 |
| b | 1.83 | 2,550 | 2.17 |
| III | | | |
| a | 1.96 | [3] | 1.08 |
| b [4] | 1.93 | 14,520 | 0.95 |
| IV | | | |
| a | 2.06 | | 0.92 |
| b | 1.98 | 11,455 | 1.14 |
| V | | | |
| a | 1.98 | 12,015 | 1.10 |
| b | 2.03 | 12,970 | 0.81 |
| VI | | | |
| a | 2.46 | | 1.06 |
| b | 2.01 | 12,330 | 0.95 |

[1] In part "a" of each example, properties of compositions after hot-pressing at 1,250° C. under 4,000 p.s.i. for 2 minutes are given. In part "b", properties of compositions after compressing at 30,000 p.s.i. and firing in air at 1,150° C. for 2 minutes are given.
[2] In standard oxidation test.
[3] A value of 25,500 p.s.i. was obtained on a bar prepared from another powder of this composition.
[4] This composition was also fabricated by mixing with enough water (containing less than 0.5% NaOH, then acidified with acetic acid) to make a paste. After shaping into bar form on a rigid substrate with a trowel, the paste was dried at 70° C. and then transferred to an oven at 1150° C. for 2 minutes. The bar caloresced within 10-30 seconds and was converted to a strong, metallic article.

*Example VII*

A powder composition was prepared from a mixture of 54 g. of unpolished, non-leafing flake aluminum (90% less than 325 mesh), boron powder (98+% pure) and silicon nitride powder (58.60% silicon), in proportions yielding 36.4% Al, 16.4% B, 19.55% N, and 27.65% Si. The mixture was dry ball-milled in a 1-quart porcelain mill containing 25 porcelain cylinders ¾" x ¾" in size for 24 hours at 80 r.p.m. The resultant fine powder was screened through 200 mesh to remove 1.4% of particles, 75 microns and larger in size. A portion of the screened powder was pressed at room temperature for 2 minutes under a pressure of 26,000 p.s.i. in a steel die into the form of a bar. The bar was placed in an electric muffle furnace, operating at 1150° C. in air. After 34 seconds, the bar had attained 1150° C. After 62 seconds, calorescence to a temperature above 1150° C. had reached its maximum and after 120 seconds, the bar was removed from the furnace, cooled, weighed and measured. During firing, the bar gained 1.89% in weight, 1.21% in width, 0.55% in thickness and 1.64% in length. The density changed from 1.91 g./cc. (green density) to 1.88 g./cc. after firing, a decrease of 1.56%. The converted bar was perfectly straight, strong, free from cracks and had a dark gray surface. This surface was removed with a grinding wheel to reduce the bar to the exact dimensions of the mold. After this grinding, the bar was bright, smooth, and metallic. It readily conducted electricity. The bar was readily cut with a hacksaw and could be drilled with carbide bits. Thus, in a rapid process, aluminum, boron TABLE IV.—AIR-FIRING OF Al-B-N-Si COMPOSITIONS

| Test No. | Firing Conditions [1] | | | Changes on Firing (percent) | | | | |
|---|---|---|---|---|---|---|---|---|
| | Temp. (° C.) | Time to Temp. (sec.) | Time to Max. Temp. (sec.) | Weight | Width | Thickness | Length | Density |
| A | 1,150 | 23 | 43 | 1.82 | 0.53 | 1.22 | 0.87 | −1.0 |
| B | 1,300 | 16 | 28 | 1.21 | 0.71 | 1.60 | 0.96 | −2.0 |
| C [2] | 1,400 | 23 | 30 | 1.23 | 0.85 | 1.49 | 0.87 | −2.0 |
| D | 1,400 | 23 | 30 | 1.56 | 1.01 | 1.92 | 1.04 | −2.0 |
| E | 1,500 | 6 | 12 | 7.73 | 2.28 | 5.22 | 1.57 | −1.0 |

[1] The total firing time for tests A–C was 2 minutes and for tests D and E was 16 hours. The bars were pressed at 30,000 p.s.i. for 2 minutes at room temperature before firing.
[2] A bar prepared in this manner showed a thermoelectric power increasing in value from room temperature to at least 650° C., at which temperature the value was $200 \times 10^{-6}$ volts/° C.

and silicon nitride powders can be converted to a strong, metallic object which requires little finishing to achieve mold dimensions and undergoes very little loss in material during the finishing operation.

The very wide latitude in firing conditions applicable to such compositions is indicated by the results in Table IV. In addition to the temperatures shown in the table, satisfactory converted objects have also been preapred at temperatures of 900 and 1000° C.

All bars were straight, strong, and free from cracks on removal from the furnace. Those which had been fired for only 2 minutes were steel gray in appearance while those fired for 16 hours were lighter gray or grayish white due to the formation of a tight, refractory, surface layer of oxide. It is noteworthy that at 1400° C. the increase in weight during 16 hours was only 0.33% more than the increase in weight during 2 minutes.

The product of Test No. A exhibited transverse rupture strength at several temperatures as follows: 1200° C., 15,700 p.s.i.; 1300° C., 12,200 p.s.i.; 1400° C., 12,200 p.s.i.; 1500° C., 8,790 p.s.i. The Knoop hardness number under 1000 g. load for this product was 100.

*Examples VIII–IX*

Powdered materials described below were ball-milled, screened through 200 mesh, and pressed at room temperature under a pressure of 30,000 p.s.i. into the form of bars 2" in length and ¼" x ¼" (nominal in other dimensions). These bars were heated in a stream of purified nitrogen as follows:

| Time (min.): | Temp. (° C.) |
|---|---|
| 15 | 350 |
| 80 | 650 |
| 117 | 900 |
| 167 | 1020 |
| 242 | 1175 |
| 292 | 1280 |
| 330 | 1400 |
| 360 | 1400 |
| 480 | 600 |

When the furnace reached 600° C. on the cooling cycle, the samples were removed, cooled and weighed. They were then surface-ground slightly to remove surface debris. The initial compositions, properties of the converted objects, and final compositions are shown in Tables V, VI and VII. Final compositions were calculated from the weight of $N_2$ gained during sintering.

TABLE V.—POWDER METALLURGY COMPOSITIONS

| Example No. | Input Powders | Input Composition | | | |
|---|---|---|---|---|---|
| | | Al | B | N | Si |
| VIII | Al, B, $Si_3N_4$ (Al dust used) | 36.40 | 16.41 | 19.55 | 27.64 |
| IX | Al, B, Si | 61.93 | 24.14 | 0 | 13.93 |

TABLE VI.—CHANGES DURING SINTERING IN $N_2$

| Example No. | Density (g./cc.) | | Resistivity [1] (ohm-cm.) Final | Percentage change [2] | | | |
|---|---|---|---|---|---|---|---|
| | "Green" | Final [2] | | Weight | Thickness | Width | Length |
| VIII | 2.00 | 2.07 | >$10^3$ | 12.51 | 3.74 | 1.80 | 1.37 |
| IX | 1.89 | 2.39 | <0.002 | 11.07 | −5.58 | −5.48 | −6.26 |

[1] "Green" resistivity for all bars was less than 0.002 ohm-cm.
[2] After slight surface-grinding, which yielded straight, strong, gray, metallic bars.

TABLE VII.—COMPOSITION AND STRENGTH OF BARS SINTERED IN $N_2$

| Example No. | Final Composition | | | | Transverse Rupture Strength at 1,400° C. (p.s.i.) |
|---|---|---|---|---|---|
| | Al | B | N | Si | |
| VIII | 32.36 | 14.58 | 28.49 | 24.57 | 7,780 |
| IX | 55.76 | 21.73 | 9.97 | 12.54 | 1,990 |

The final converted objects of this invention, upon being heated at high temperatures in air, undergo some oxidation and nitridation. However, dimensional changes are limited to a few percent (and even to 0.1% by choice of ingredients and process) when the objects are exposed in air at temperatures up to 1500° C. Despite the fact that gain in weight may range from less than 1% to 10–30% (in porous objects), the objects are strengthened and porosity is reduced by such heat-treatment and there is little distortion or cracking in comparison with other high temperature materials.

Since the converted objects of this invention, depending chiefly upon their aluminum content, range from electrically insulating to electrically conducting, and are comparable to graphite in density, they are especially useful in high temperature electrical applications. In such applications, these converted objects possess the great advantage over graphite that protection from contact with air is unnecessary. The converted objects exhibit a transverse rupture strength-to-weight ratio which ranges up to ten times that of graphite.

In preparing electrical heating elements, it is sometimes desirable to heat-treat the center portion of a rod, thereby increasing the electrical resistance thereof but to leave the end portions unheat-treated (or heat-treated only to temperatures of 1100°–1200° C.) and therefore highly conducting. Such elements are especially suitable for application at temperatures in the range of 1000°–1500° C. and above.

The composition of the converted objects, as described above, is given in terms of the major components, i.e., the essential constituents. However, there may also be present amounts not exceeding 10%, usually less than 5%, and preferably less than 3% of other materials such as metal oxides that do not materially affect the novel properties of the converted objects. Such additional materials are generally present in commercial forms of the materials used in preparing the compositions of this invention. It is preferred that the powder metallurgy compositions be substantially free from uncombined elements such as titanium, zirconium, molybdenum, chromium, iron, and carbon which adversely affect the firing process and the final properties of the converted objects.

As indicated above, some of the converted objects, dependent on composition and porosity, undergo a considerable gain in weight on heating at 500–1100° C., then a much smaller weight gain on further heating at higher temperatures up to 1300–1400° C. By way of further illustration, the product of Example III–b, which attained on firing a temperature of 1150° C. in 26 seconds and a maximum temperature above this in 45 seconds, was a perfectly straight, black-surfaced metallic object after firing. During firing the bar increased in weight 3.3%, in width 2.13%, in thickness 4.05%, and in length 1.27%. The density decreased 3.89%. After heating in air for 20 minutes at 1200° C., the bar was analyzed and found to contain 34.03% Al, 14.52% B, 17.80% N, 25.27% Si, and 8.38% O (by difference). Thus, oxygen pickup during ball-milling, firing and subsequent heating in air was less than 8.4%. X-ray examination showed the product to consist of AlN, Si, and some α- and β-$Si_3N_4$. There was no indication of the presence of crystalline oxides nor of known crystalline forms of boron or compounds of boron with aluminum or silicon.

Results of the standard oxidation resistance test on the products of Examples III–a and III–b are shown in Table VIII.

TABLE VIII.—OXIDATION RESISTANCE TEST RESULTS

| Temperature (° C.) | 500 | 750 | 1,000 | 1,100 | 1,200 | 1,300 | 1,400 | 1,500 |
|---|---|---|---|---|---|---|---|---|
| Product III-a: | | | | | | | | |
| Change in weight (percent) | 0.16 | 5.08 | 7.79 | 8.22 | 8.38 | 8.91 | 12.52 | 17.52 |
| Change in linear dimension (percent) | | 0.12 | | 0.17 | 0.17 | 0.33 | 0.95 | 3.14 |
| Product III-b: | | | | | | | | |
| Change in weight (percent) | 0.71 | 14.37 | 14.32 | 14.43 | 14.43 | 14.51 | 15.53 | 23.22 |
| Change in linear dimension (percent) | 0.08 | 0.07 | 0.14 | 0.35 | 0.59 | 0.65 | 1.08 | 5.0 |

The converted objects of this invention are useful as furnace parts, hot-pressing molds, parts of heat engines, especially those to be air-borne, parts of aircraft subject to high heat by virtue of high velocity in the atmosphere, and high temperature testing fixtures. They are also suitable for use in shielding thermonuclear reactors from the escape of neutrons. They have high thermoelectric power and can therefore be used for generation of electricity by the application of heat. When sufficient aluminum is used for the converted objects to be electrically conductive, they serve admirably as electric heating elements. They are used also as structural objects in pumps, containers, pipes and other equipment processing molten metals, such as Al, Fe and Cu alloys.

The foregoing detailed description has been given for clarity of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A high temperature-resistant converted composition consisting essentially of aluminum, boron, nitrogen, silicon and oxygen in the proportions by weight based on total aluminum, boron, nitrogen, and silicon of 15–70% Al, 1–45% B, 5–35% N, 10–55% Si, and 0–30% O, said composition containing (1) a solid continuous matrix structure comprising aluminum nitride and (2) 5–84.4% by weight, based on converted composition, of a metallic structure containing at least 5%, based on converted composition, of silicon in the form of elemental silicon, silicon-aluminum alloys, silicon-boron alloys, and silicon-aluminum-boron alloys.

2. A high temperautre-resistant converted composition consisting essentially of aluminum, boron, nitrogen, and silicon in the proportions by weight based on total aluminum, boron, nitrogen, and silicon of 19–60% Al, 2–28% B, 10–30% N, and 10–35% Si, said composition containing (1) a solid continuous matrix structure comprising aluminum nitride and (2) a metallic structure containing at least 5% based on the weight of the composition of silicon, said metallic structure constituting at most 68.7% by weight of the converted composition.

3. A high temperature-resistant converted composition consisting essentially of aluminum, boron, nitrogen, and silicon in the proportions by weight based on total aluminum, boron, nitrogen, and silicon of 25–56% Al, 5–28% B, 10–25% N, and 10–35% Si, said composition containing (1) a solid continuous matrix structure comprising aluminum nitride and (2) a metallic structure comprising a silicon-aluminum alloy which contains at least 5% based on the weight of the composition of silicon, said metallic structure constituting 5–65.7% by weight of the converted composition.

4. A powder in which at least 75% by weight of the powder has a particle size of less than 75 microns, said powder consisting essentially of aluminum, boron, nitrogen, silicon, and oxygen in the proportions by weight based on total aluminum, boron, nitrogen, and silicon of 15–70% Al, 1–45% B, 5–35% N, 10–55% Si, and 0–30% O, the proportions being so chosen as to provide after reaction a converted composition containing (1) a solid continuous matrix structure composed of aluminum nitride and (2) 5–84% by weight of a metallic structure containing at least one member of the group consisting of silicon, silicon-aluminum alloys, silicon-boron alloys, and silicon-aluminum-boron alloys, wherein said metallic structure contains at least 5% by weight, of silicon based on converted composition.

5. A high temperature-resistant converted composition consisting essentially of aluminum, boron, nitrogen and silicon in the proportions by weight of 36.40% Al, 16.41% B, 19.55% N, and 27.64% Si, said composition containing (1) a solid continuous matrix structure comprising aluminum nitride and (2) a metallic structure containing at least 5% by weight, based on converted composition, of silicon in the form of elemental silicon, silicon-aluminum alloys, silicon-boron alloys, and silicon-aluminum-boron alloys.

6. A dimensionally stable object consisting essentially of aluminum, boron, nitrogen, and silicon in the proportions by weight of 39.65% Al, 8.96% B, 21.29% N, and 30.10% Si, said object containing (1) a solid continuous matrix structure comprising aluminum nitride and (2) a metallic structure containing at least 5% by weight of the object, of silicon in the form of elemental silicon, silicon-aluminum alloys, silicon-boron alloys, and silicon-aluminum-boron alloys.

7. A high temperature-resistant converted composition consisting essentially of aluminum, boron, nitrogen, and silicon in the proportions by weight of 41.51% Al, 4.69% B, 22.29% N, and 31.51% Si, said composition containing (1) a solid continuous matrix structure comprising aluminum nitride and (2) a metallic structure containing at least 5% by weight, based on converted composition, of silicon in the form of elemental silicon, silicon-aluminum alloys, silicon-boron alloys, and silicon-aluminum-boron alloys.

8. A high temperature-resistant converted composition consisting essentially of aluminum, boron, nitrogen and silicon in the proportions by weight based on total aluminum, boron, nitrogen, and silicon of 19–60% Al, 2–28% B, 10–30% N, and 10–35% Si, wherein the total boron and silicon is at least 25%, said composition containing (1) a solid continuous matrix structure comprising aluminum nitride and (2) 5–68.7% by weight, based on converted composition, of a metallic structure containing silicon.

9. Process for preparing high temperature-resistant, converted compositions of claim 1 which comprises heating at a temperature of 700–1425° C. elemental aluminum-silicon nitride-elemental boron compacts containing 15–70% Al, 15–85% silicon nitride, and 1–45% boron, wherein said compacts contain a maximum of 35% by weight nitrogen and at least 5% by weight, based on converted composition, of aluminum and silicon in excess of the amount required to react completely with the nitrogen and oxygen present.

References Cited by the Examiner

UNITED STATES PATENTS 2,929,126  3/1960  Bollack et al.
3,151,994  10/1964  Adlassing _____ 29—182.5
3,236,663  2/1966  Gruike et al. _____ 106—65

L. DEWAYNE RUTLEDGE, *Primary Examiner.*

REUBEN EPSTEIN, *Examiner.*

R. L. GRUDZIECKI, *Assistant Examiner.*